UNITED STATES PATENT OFFICE.

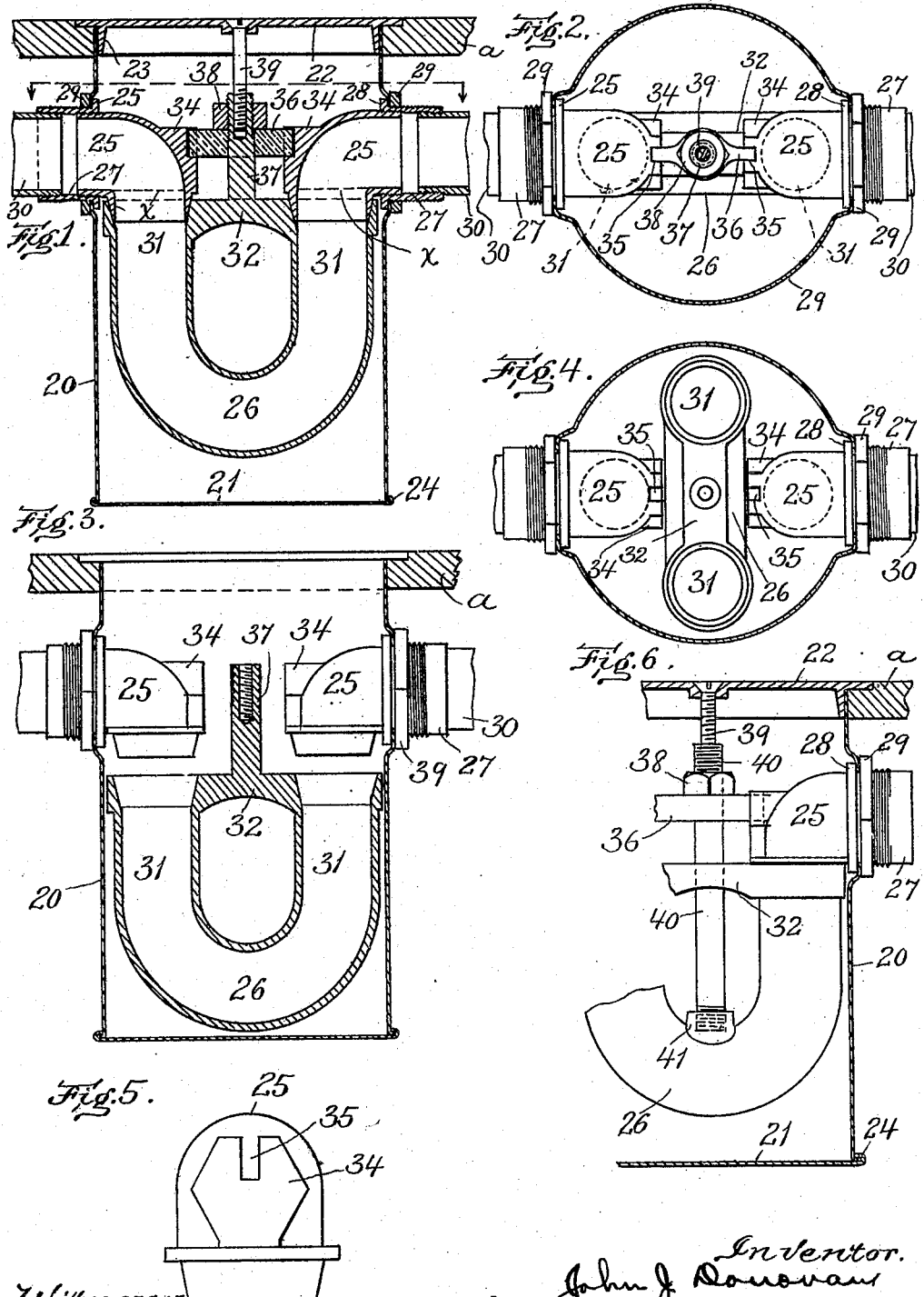

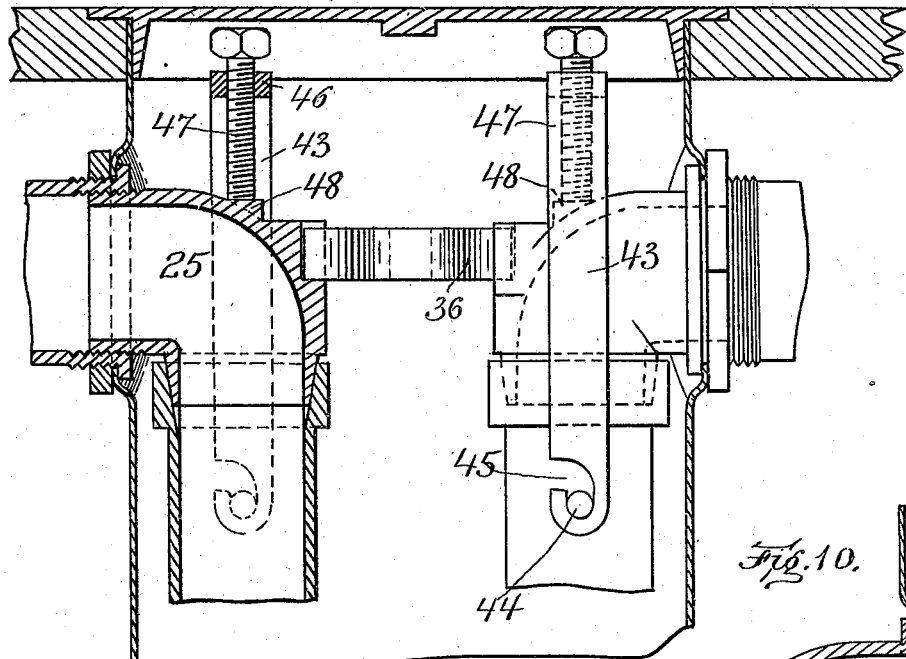

JOHN J. DONOVAN, OF BOSTON, MASSACHUSETTS.

TRAP.

No. 919,701.    Specification of Letters Patent.    Patented April 27, 1909.

Application filed January 9, 1909. Serial No. 471,378.

*To all whom it may concern:*

Be it known that I, JOHN J. DONOVAN, of Boston, in the county of Suffolk and State of Massachusetts, have invented certain new and useful Improvements in Traps, of which the following is a specification.

This invention has relation to plumbing traps, and more particularly to what are known as bath-tub traps which are ordinarily located in the space between the floor of the bath-room and the ceiling of the room below.

As such traps are commonly constructed, it is necessary, unless access is had thereto through the ceiling of the room below, to remove a portion of the bath-room floor, when it is desired to clean out the trap or the waste pipes which are connected therewith.

My invention has for its object to provide certain improvements in traps of the character described, which will obviate the necessity of removing the flooring boards to permit access thereto.

Further objects of the invention are to so construct the trap that it may be easily and quickly cleaned, to provide for the cleaning of the wastepipes with facility, to provide for the entire removal of the trap member in cleaning the trap, to prevent leakage of water from the trap to the ceiling below, to guard against the escape of sewer gas, and to insure sanitary conditions at all times.

The accompanying drawings illustrate several embodiments of the invention which accomplish the objects set forth, for my improved trap may be constructed in a variety of different forms which will readily suggest themselves to those skilled in the art to which the invention relates.

Figure 1 represents a longitudinal vertical section through one form of the invention. Fig. 2 represents a horizontal section of the same on the line 2—2 of Fig. 1. Fig. 3 represents a section similar to Fig. 1 and shows how the trap member may be disengaged from the elbows preparatory to its removal. Fig. 4 represents a horizontal section similar to Fig. 2 and shows the trap member partially rotated so that it may be lifted up from the casing. Fig. 5 represents in end view one of the elbows. Fig. 6 illustrates a portion of the trap constituting another embodiment of the invention. Fig. 7 represents still another embodiment of the invention in which yokes are utilized for connecting the trap member with the elbows. Fig. 8 represents a fourth embodiment of the invention. Fig. 9 represents a section on the line 9—9 of Fig. 8. Fig. 10 illustrates still another embodiment of the invention in which screw couplings or unions are utilized for connecting the limbs of the trap member with the elbows. Fig. 11 shows in section one of the elbows supported directly by the casing instead of by a sleeve or coupling as in the devices illustrated in the preceding figures.

Referring to the accompanying drawings, and more particularly to Figs. 1 to 5 inclusive, which illustrate one embodiment of the invention, it will be observed that I employ a casing having a cylindrical side wall 20 and a bottom wall 21. The height of this casing is less than the distance between the ceiling and the floor of the room above so that it may be located below the bath-room floor which in Fig. 1 is indicated at *a*. The upper end of the casing is closed by a metallic plate 22 which may be set flush with the surface of the floor and which is provided with a circular flange 23 to fit in or over the upper open end of the casing. It is not essential that the casing should be cylindrical as it may be square or oblong in plan view, or otherwise shaped as desired. It is preferably water-tight and is made of suitable metal such as brass. If made of sheet brass, the bottom is secured to the side wall by a lipped seam 24 so that, when the trap is removed, a flame may be blown against the interior of the casing to cleanse it, destroy germs and microbes, and render it partially antiseptic, without melting any solder or injuring its water-tight qualities.

The casing serves to inclose the trap and to position the parts thereof. The trap, as illustrated, consists of elbows or connections 25 25 and a U-shaped trap member 26, the latter being formed separately from the elbows and being detachable therefrom as will be explained. One end of each elbow is screwed into a sleeve or coupling 27 which is passed through an aperture in the side wall 20 of the casing near the top of the latter. The apertures are diametrically opposite each other and they are formed in off-set portions of the wall as best shown in Fig. 7 or Fig. 10. Each sleeve 27 has upon its inner end a shoulder 28 which bears against the wall of the casing, and it is exteriorly threaded to receive a nut 29 which co-acts with the shoulder 28 in clamping the sleeve or coupling rigidly to the wall of the casing. Washers (not shown) may be introduced between the shoulder and the casing, and between the casing and the nut 29 if desired, to make the connection absolutely watertight, although this is not necessary in every case. The outer ends of the sleeves or couplings 27 are interiorly threaded to receive the ends of the waste pipe sections 30 30. The trap member 26, as shown in Figs. 1 and 2, is U-shaped and it has two parallel limbs 31 31, connected by a bridge or crossbar 32. The ends of the limbs 31 are ground flaring so as to receive the exteriorly tapering ground inner ends of the elbows 25 so as to form what are termed "ground joints" between the elbows and the trap member.

The invention is not limited to the employment of ground joints, because, as will be explained, these joints are sealed under water, and yet, for practical purposes, I prefer to employ such joints for reasons which are obvious to those familiar with this art.

It is apparent that any convenient means may be employed for connecting the trap member with the elbows. In Figs. 1 to 5 under discussion, I have shown one form of connection which may be utilized if desired. The elbows 25 25 are provided with hexagonal bosses 34 which enable them to be rotated and screwed into the couplings 27. These bosses are provided with grooves or guideways 35 to receive the ends of a cross-bar 36, which has an aperture through which is passed a stem 37 projecting upwardly from the bridge or cross-bar 32. The end of the stem 37 is exteriorly threaded to receive a nut 38, so that by passing the stem 37 upwardly through the cross-bar 36 and rotating the nut 38, the flaring ends of the trap member may be drawn positively into firm engagement with the tapering ends of the elbows and thereby insure a tight connection between them. In addition to serving as a support for the trap member, the cross-bar 36, in conjunction with the guideways 35 in the elbows 25, operates to accurately position the elbows so as to insure their proper engagement with the trap member.

The stem 37 is utilized in securing the cover 22 in place, and to this end, it is internally threaded to receive a screw 39 which is passed downwardly through the center of the plate.

For the purpose of cleaning out the trap, the screw 39 is removed and the cover 22 is displaced. By a suitable wrench, the nut 38 is withdrawn from the stem, the trap member 26 dropping downward as the nut is removed. The trap member is steadied with the hand to prevent spilling of its contents, and is given a quarter turn as shown in Fig. 4, after which it is lifted out, the elbows 25, 25 being spaced far enough apart to permit this. The trap may be then emptied of its contents, the casing catching whatever water may be spilled in this operation. If it be desired to clean out the waste pipes, the elbows are either removed, or else are given a half turn so that their inner ends project upwardly, thus constituting cleanouts and permitting the insertion of a wire or other cleaning device into the waste pipes. Before the trap is replaced, the casing may be sponged or wiped and subjected to any desired operation for cleaning it and rendering it free from germs or dirt.

Instead of partially rotating the trap member and withdrawing it vertically in the direction of the axis of its rotation, it could first be removed laterally and then lifted out by making the casing wider than it is shown on the drawings, without departing from the spirit of the invention.

As previously indicated, it is quite apparent that the invention is capable of a variety of embodiments. In lieu of forming the stem 37 integrally with the bridge 32, it may be formed as a rod 40, see Fig. 6, and passed loosely through the bridge 32 into threaded engagement with a boss 41 formed in the bend of the trap member. Again, instead of employing the devices shown in Figs. 1 to 6 for attaching the trap member to the elbows, which, as set forth, comprise the central stem, the cross-bar and the nut, the ends of the trap member may be separately secured to the two elbows respectively by other means. In Fig. 7, I illustrate one means of accomplishing this purpose. In this case, I utilize the cross-bar 36 for the purpose of accurately positioning the elbows, but provide yokes 43 which are connected with the limbs of the trap member. Each limb of the trap member is provided with laterally and oppositely projecting studs 44, and the ends of the side bars of the yokes are formed with open slots 45 so that they may be engaged with the studs or projections. Through the end bars 46 of the yokes are passed screws 47, the ends of which are engaged with flat portions 48 formed on the elbows.

Another convenient means for securing the trap member to the elbows consists of couplings, as shown in Fig. 10. In this case, each of the elbows is exteriorly threaded above its tapering inner end to receive a flanged coupling sleeve 50. This sleeve is preferably polygonal in end view or else is corrugated or ribbed so that it may be rotated by means of a suitable tool. The end of each limb of the trap member is threaded to receive a sleeve 51 which is flaring so as to fit the tapering inner end of the elbow with which it is engaged. The sleeve 51 has a shoulder which may be engaged by the sleeve or coupling 50. With this construction, each of the limbs of the trap is attached to its elbow independently of the other.

In Figs. 8 and 9, I have illustrated a slight modification from the devices shown in Figs. 1 to 5, in which the cross-bar 52 has arms 53 which rest upon bosses 54 projecting laterally from the elbows. In this case, the cross-bar 52 has ribs or projections 55 which extend in the slots in the elbows, as described in connection with Figs. 1 to 7.

Instead of passing the sleeves or couplings through the casing, the elbows may be supported directly by the walls of the casing as shown in Fig. 11. In this instance, the elbows would be provided with flanges or shoulders 55, and nuts 56 (with or without washers) threaded onto the outwardly projecting ends, the waste pipes or couplings being screwed on the ends of the elbows. Other minor changes of this character may be made as desired.

In all of these various forms or embodiments of the invention which I have thus described in detail, I have preserved the two quarter-bend elbows, the U-shaped trap member, and means for detachably connecting them and holding them in proper engagement. The elbows and the trap member are all preferably cast in the form desired, and a relatively wide range of equivalents may be employed for the illustrated means by which they are connected.

The joints between the trap member and the elbows may be ground as shown, or provided with washers, and below the normal level of the water as indicated by the dotted line $x$ in Fig. 1, so that there is no chance for the escape of gas, and, if there should be a leakage of water through one of the joints from any cause whatever, the water will escape into and be caught by the casing in which it will rise to the level indicated by said dotted line above the inner ends of the elbows. Should the water rise above said level in the casing by reason of a prolonged flushing of the trap by waste from the tub, it will subsequently flow back through the leaky joint into the trap or out through the delivery elbow.

The casing serves not only to catch the water spilled in cleaning the trap, but it also serves as a holder for maintaining the sleeves 27 27 and the elbows in proper position after the trap member is removed. The elbows likewise serve a dual purpose in that they connect the trap member with the waste pipes, and also serve as clean-outs for the waste pipes.

A trap having the features hereinbefore described, possesses other advantages in addition to those already pointed out, and is admirably adapted for hotels, hospitals, laboratories and the like, as well as for residences. While I have described it as best adapted to be used in the waste pipe from a bath-tub, it will be understood that its use is by no means limited thereto, since the trap may be employed for divers other purposes which will readily suggest themselves.

Having thus explained the nature of my said invention and described a way of constructing and using the same, although without attempting to set forth all of the forms in which it may be made or all of the modes of its use, what I claim is:

1. The combination of a casing adapted to hold water, elbows entering the sides of said casing and curved downwardly, and a trap member detachably connected with said elbows.

2. A trap comprising a casing, oppositely arranged elbows arranged in said casing, a detachable trap member, and means for connecting said trap member to said elbows.

3. A trap comprising a casing adapted to be located beneath the floor, a U-shaped trap member in said casing, elbows having their inner ends projecting downwardly in alinement with the ends of the trap member, and means for connecting said trap member with said elbows.

4. A trap comprising a water-tight casing, oppositely arranged elbows in said casing adapted to be connected with the waste pipe and having downwardly turned inner ends, a trap member, and means for detachably connecting said trap member with said elbows, said elbows being separated by a space greater than the width of said trap member, so that said trap member may be disconnected, partially rotated, and lifted out of the casing.

5. A trap comprising two oppositely arranged elbows adapted to be connected with the waste pipe and having downwardly turned inner ends, a cross-bar for engagement with said elbows to position them, a trap member, and means for detachably joining said trap member with said elbows.

6. A trap comprising a casing, elbows supported by said casing, a trap member, means for detachably connecting said trap member with said elbows, said elbows being rotatable after the trap member is removed to permit the cleaning of the waste pipe connected therewith, substantially as described.

7. A trap comprising a casing having diametrically opposite apertures, sleeves or couplings passed through said apertures, elbows in said casing detachably engaged with said sleeves or couplings, and a U-shaped trap member detachably connected to said elbows.

8. A trap comprising a casing having diametrically opposite apertures, sleeves or couplings passed through said apertures, means for securing said sleeves or couplings to said casing, elbows in said casing in threaded engagement with said sleeves or couplings and having their inner ends turned downwardly, a trap member, and means for detachably connecting said trap member to the inner ends of said elbows.

9. A trap comprising a substantially water-tight casing, a cover therefor, couplings extending into the casing, and detachable trapping means in said casing connected to said couplings, substantially as set forth.

10. A trap comprising a casing, waste pipe couplings, a trap member in the casing, and detachable connections between said couplings and said trap member adapted to serve as clean-outs for the waste pipe when the trap member is disconnected.

11. A trap comprising oppositely arranged downwardly-turned elbows having opposing guideways, a cross-bar detachably placed in said guideways, a detachable trap member, said trap member and said elbows having complemental jointed ends, and means for attaching said trap member to and supporting it by said elbows.

12. A trap comprising oppositely arranged downwardly-turned elbows having opposing guideways, a cross-bar detachably placed in said guideways, a detachable trap member, said trap member and said elbows having complemental jointed ends, and means extending between said trap member and said cross-bar for connecting said trap member to said elbows.

13. A trap comprising oppositely arranged downwardly-turned elbows having opposing guideways, a cross-bar detachably placed in said guideways, a detachable trap member, said trap member and said elbows having complemental jointed ends, a threaded stem attached to said trap member and passed through said cross-bar, and a nut on said stem bearing against said cross-bar.

In testimony whereof I have affixed my signature, in presence of two witnesses.

JOHN J. DONOVAN.

Witnesses:
MARCUS B. MOY,
P. W. PEZZETTI.